United States Patent
Walker

[15] 3,661,359
[45] May 9, 1972

[54] ENERGY ABSORBER

[72] Inventor: Brooks Walker, 1280 Columbus Avenue, San Francisco, Calif. 94133

[22] Filed: Jan. 12, 1970

[21] Appl. No.: 2,327

[52] U.S. Cl. .......................... 256/1, 256/13.1, 293/DIG. 3, 293/71 P, 114/219
[51] Int. Cl. .............................................. E01f 15/00
[58] Field of Search .......................... 293/1, 51 F, 71, 71 P; 267/122; 9/8; 188/13.1; 256/1; 61/48; 114/219

[56] References Cited

UNITED STATES PATENTS

| | | |
|---|---|---|
| 3,502,362 | 3/1970 | Eshelman..........................293/71 X |
| 3,503,600 | 3/1970 | Rich.....................................293/1 X |
| 3,512,822 | 5/1970 | Rich et al...............................293/1 |

FOREIGN PATENTS OR APPLICATIONS

| | | |
|---|---|---|
| 559,182 | 7/1957 | Belgium..............................114/219 |
| 718,624 | 11/1954 | Great Britain.......................114/219 |

Primary Examiner—Arthur L. La Point
Assistant Examiner—Robert Saifer

[57] ABSTRACT

The object of this invention is to form an energy absorber of used auto tires and rims mounted so as to receive the impact on the tire tread and collapse the rim with enough energy, the tires to be filled with liquid with holes and blow-out plugs, the rims and plugs to be cheap enough to be thrown away after a serious accident.

8 Claims, 4 Drawing Figures

PATENTED MAY 9 1972 3,661,359
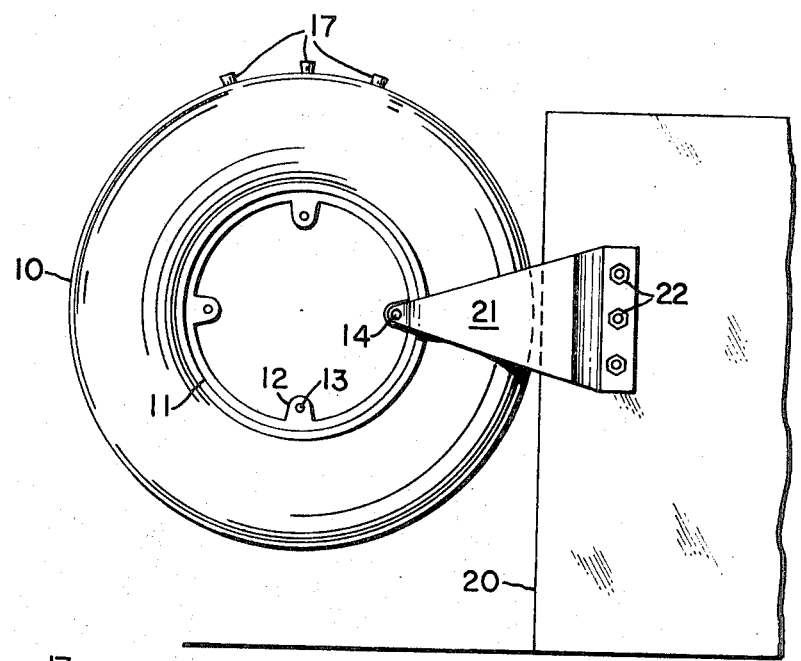
FIG_1
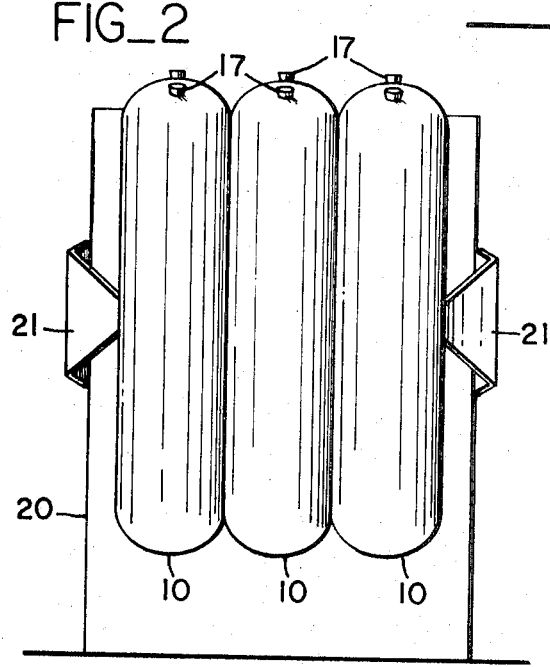
FIG_2
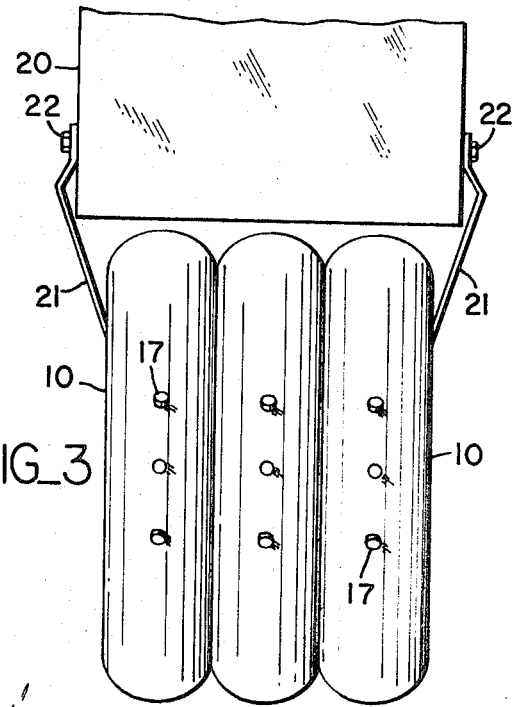
FIG_3
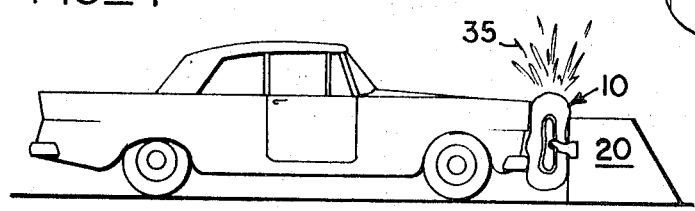
FIG_4
INVENTOR.
BROOKS WALKER
BY

ENERGY ABSORBER

An object of the invention is as stated in the abstract.

Another object is to find an important life and property saving use for old tires with tread too thin for use but still very strong for use as collapsible energy absorbing abutments and also an important use for old rims or inexpensive collapsible rims.

Another object is to support one or more tires against an abutment with their normal axis of rotation (though mounted stationary) generally at right angles to the line of motion of a vehicle approaching the abutment. Filling the tires with a liquid. Making the rims on which the tires are mounted of limited resistance on sufficient impact by a vehicle to collapse across their diameter. Providing limited exit orifice near the tops of the tires for the liquid filling. By this construction to provide energy absorption after impact by collapse or flattening of both sides of said tires and major flattening of the diameter of the rims to provide a substantial distance of energy absorption to reduce the damage to the vehicle and its occupants on running into the abutment so constructed. The absorber can be one or more tires so mounted; if more than one they can and should be fastened together. The fastening to the abutment should be collapsible so as not to harpoon the vehicle.

Other objects will be pointed out in the accompanying specification and claims.

I have illustrated my invention by way of example in the accompanying drawings, in which:

FIG. 1 illustrates one form of the invention in side elevation.

FIG. 2 shows a front elevation of the same construction shown in FIG. 1.

FIG. 3 is a top view of the same invention as shown in FIGS. 1 and 2.

FIG. 4 is a side elevation of a vehicle impacting said invention energy absorber flattening or deforming the tires on both front and back and ejecting some of the liquid filling through limited orifices.

In all views similar numerals show similar or the same parts.

In all figures a series of suitable new, special or used tires 10 are secured together by bolts or rivets 13 through lug 12 on rims 11. Bolt 14 secures the rims 11 and tires 10 to collapsible bracket 21 which bracket 21 is secured to abutment 20 by suitable bolts 22.

The tires 10 are preferably filled with a non-freezing liquid such as salt water 35 if used in a freezing climate or, if not subject to freezing, plain water is suitable.

Blow out plugs 17 are inserted in limited ejection orifices in the upper portion of said tires 10. When mounted as shown retainers or chains or cords can be used to prevent loss after impact.

On impact of a vehicle as shown in FIG. 4 the tires will deform in front against the vehicle and at the rear against the abutment, the rim will flatten, and the bracket 21 will give with the flattening of the tire against the abutment. The tires are shown slightly away from the abutment to allow some resistive collapse or deforming of the support bracket 21 on initial impact. If desired the tires can be against the abutment, or the abutment can be slightly concave to fit a portion of the tire tread diameter or of slightly more radius to give more contact with the tire gradually with the flattening of the tire.

After a limited impact that does not seriously deform the rims 11, the tires can be refilled with liquid and the blow-out plugs replaced and the abutment is ready for protection again. If the rims are seriously deformed they can possibly be made approximately round in a suitable press for rims or new rims used with the old tires if not damaged so as to be unusable again in an abutment to hold liquid, etc.

There are great quantities of used tires available and possibly large quantities of car wheels which can have the centers cut out to leave lugs such as 13 left for securing the wheels together and yet allow the rims to flatten on sufficient impact some portion of the wheel portion to the bolt circle may be left in addition to the lug portion 12 if more resistance to collapse is desired.

I have illustrated my inventions in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim:

1. An energy absorber secured to an abutment, said absorber comprising at least one vehicle tire mounted on a metallic hollow rim of substantially the width of the tire, said rim member being substantially devoid of a wheel supporting center and collapsible radially on heavy impact of predetermined value by a moving vehicle radially of the tire and secured to said tire in a liquid-tight seal, the attachment of said absorber to said abutment being provided by a structure that is partially collapsible on said heavy impact, liquid contained in and filling at least part of said tire and blowout plugs mounted in openings in the upper portion of said tire.

2. An energy absorber comprising a plurality of vehicle tires, a corresponding plurality of hollow rim members substantially devoid of wheel supporting centers, each mounting one of the tires with a liquid-tight fit between each said hollow rim member and its respective tire, means for securing the tires together in side-by-side relation, means for attaching the plurality of tires and rim members to an abutment with the tread portion of the tires toward the abutment, liquid filling a major portion of said tires, holes in the upper portion of said tires, blowout plugs for said holes, said plugs being blown out by the liquid filling inside said tires on heavy impact of predetermined value with a vehicle, the means for attaching said absorber to said abutment being collapsible upon a predetermined force of impact.

3. A device as described in claim 2 in which the absorber is attached to said abutment with the tires parallel to each other, each tire positioned in a plane substantially in line with the expected line of impact of said vehicle against said abutment.

4. An energy absorber provided by a plurality of vehicle tires each mounted on a metallic ring member according to claim 3, said tires and ring members being secured together in coaxial relation.

5. An energy absorber according to claim 4 in which the mounting means for the absorber is secured to at least a pair of the ring members for supporting the absorber, said mounting means being collapsible by substantially the same ring-member collapsing force.

6. An energy absorber in the form of a series of partially liquid filled vehicle tires mounted next to each other on radially collapsible metallic rims attached to an abutment, so that a vehicle coming toward and against said abutment will contact one tread area of said tires while said abutment is contacting the diametrically opposite tread area of said tires, restrictive flow opening in said tires to offer substantial resistance to the rapid flow therefrom of said liquid filling on heavy impact above a predetermined value of said vehicle with said absorber, said rim being collapsible radially on sufficient impact, said rim having the wheel portion normally attached to said rim but substantially devoid of its wheel supporting center in order to offer less resistance to collapse, said rims being secured together so that adjacent tire sides abut each other.

7. An energy absorber comprising at least one vehicle tire fitted on a metallic ring member which is the rim portion of a vehicle wheel upon which such tire is normally mounted and said wheel being substantially devoid of its wheel supporting center, said at least one tire being at least partially filled with liquid and provided with a blowout plug in its outer wall, means mounting said absorber upon an abutment with the tread portion facing the abutment, the ring member being radially collapsible upon a predetermined radial force thereagainst.

8. An energy absorber according to claim 7 in which the mounting means for the absorber is secured to the ring member, said mounting means being collapsible by substantially the same ring-member collapsing force.

* * * * *